Figures 1, 5:
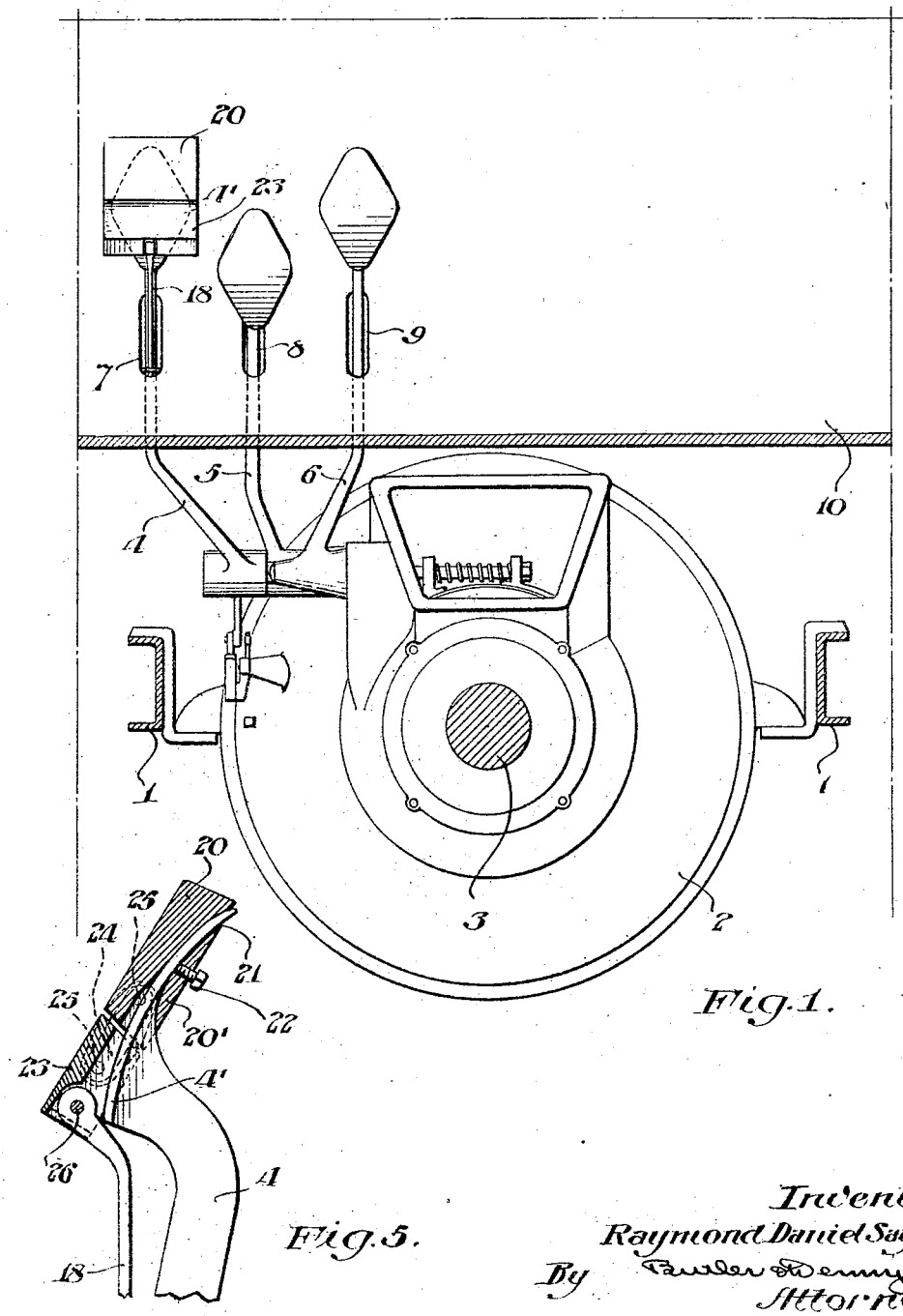

June 9, 1925.

R. D. SAYLOR 1,541,529

CLUTCH PEDAL CONTROL ATTACHMENT FOR AUTOMOBILES

Filed Aug. 30, 1922 2 Sheets-Sheet 1

Inventor.
Raymond Daniel Saylor,
By
Attorneys

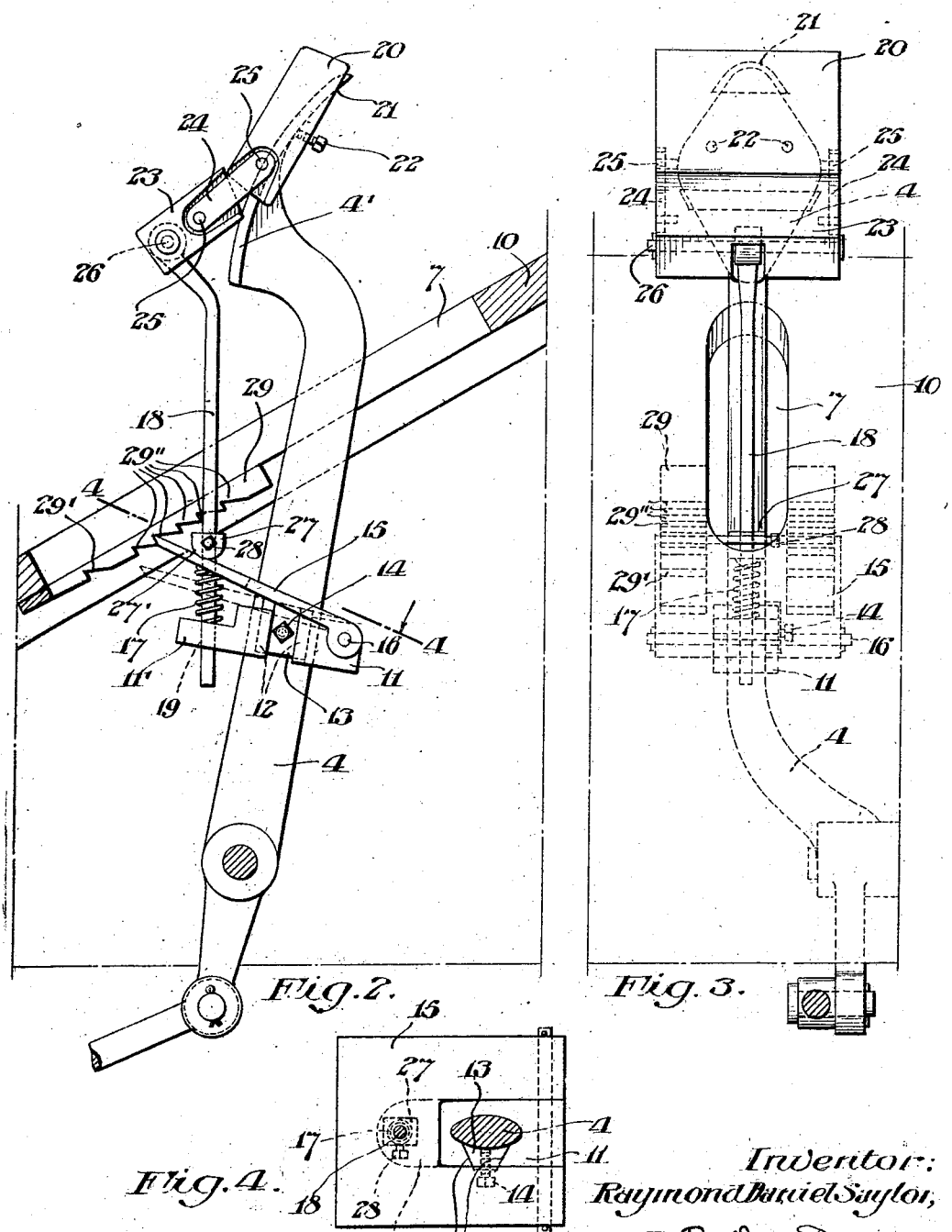

Patented June 9, 1925.

1,541,529

UNITED STATES PATENT OFFICE.

RAYMOND D. SAYLOR, OF NEW RINGGOLD, PENNSYLVANIA.

CLUTCH-PEDAL-CONTROL ATTACHMENT FOR AUTOMOBILES.

Application filed August 30, 1922. Serial No. 585,137.

*To all whom it may concern:*

Be it known that I, RAYMOND DANIEL SAYLOR, a citizen of the United States, residing at New Ringgold, in the county of Schuylkill and State of Pennsylvania, have invented a Clutch-Pedal-Control Attachment for Automobiles, of which the following is a specification.

My invention is designed to provide means for securing in desired predetermined positions the clutch-pedal of clutch and transmission mechanism of the Ford type in which the engine is normally connected with the driving shaft in high gear by spring pressure, it being necessary in such constructions to manually hold the clutch pedal in "neutral" or "low" gear. By my improvements, the pedal is automatically latched when moved to "neutral" or "low" gear, the latching mechanism being readily releasable by the manipulation of the foot on the pedal.

Objects of my invention are to provide simple, reliable and easily applied mechanism to positively control the movements of the clutch pedal, thereby avoiding the tiresome necessity for holding the foot on the pedal when operating on low gear or neutral and obviating dangers due to the slipping of the foot from the clutch pedal, frequently resulting in sudden starts on high gear causing injury or stalling the engine, or causing possible upsets of the car as a result of unintentional engagement simultaneously of the "reverse" and high speed forward transmission mechanism. My improvements further insure correct positioning of the pedal for the various control operations, without the necessity of the "feeling" heretofore practiced.

The characteristic features of my invention will more fully appear from the following description of a preferred embodiment thereof and the accompanying drawings in illustration of the same.

In the drawings, Fig. 1 is an elevation of clutch, transmission and brake mechanism of an automobile having my attachment applied thereto; Fig. 2 is an enlarged side view of the clutch-pedal and control attachment; Fig. 3 is an enlarged front view of the clutch-pedal and control attachment; Fig. 4 is a transverse sectional view on the line 4—4 of Fig. 2; and Fig. 5 is an enlarged sectional view of the clutch-pedal foot rest and shoe therefor.

As shown in the drawings, the automobile chassis frame 1 supports a casing 2 containing the usual Ford disk-clutch, planetary transmission and foot brake mechanism connected with the driving shaft 3 and controlled by the fulcrumed clutch pedal 4, reverse pedal 5 and foot brake 6, which pass through the respective slots 7, 8 and 9 in the fixed floor board 10. As is well known, the "reverse" and foot-brake mechanisms, with their corresponding pedals 5 and 6, are normally in inoperative positions, while the clutch and transmission mechanisms are normally positioned for "high" speed by spring pressure, the pedal 4 being thereby thrown to the rear of the slot 7. The transmission mechanism is thrown into "low" gear by moving the pedal 4 by pressure on the foot rest 4' to the front of the slot 7, and the clutch is moved into "neutral" by moving the pedal 4 into intermediate position in the slot 7, either by pressure on the foot rest 4' or the operation of the usual hand lever.

A yoke or collar 11, sleeved on the pedal 4 beneath the board 10, is provided with undercut grooves 12 forming a way for the engagement of a wedge 13 having threaded therein a set screw 14, whereby the collar may be adjustably fixed to the pedal. A pawl 15 is pivotally connected to the collar 11 by a pintle 16 and is normally pressed upward by a spring 17 resting upon the collar extension 11', the spring being coiled around the link 18 passing freely through a slot 19 in the collar extension 11'.

A hollow shoe 20 is slipped over the foot rest 4', the toe of which may project through the slot 21, the shoe being firmly fixed to the foot rest by the set screw 22 in the cross piece 20'. A rocking member 23 is pivotally connected with the shoe 20 by the inset links 24 and pintles 25, and has set therein a pin 26 on which is fulcrumed the bent upper end of the link 18. A nut 27 threaded on the link 18 and fixed thereto by a set screw 28 has its curved lower surface 27' engaging the upper surface of the pawl 15, so that pressure on the rocking member 23 will be transmitted through the link 18 and nut 27 to depress the pawl against the pressure of the spring 17.

The rocking of the pedal 4 on its fulcrum oscillates the tip of the pawl 15 in the path of the teeth 29' and 29'' of the ratchet 29 fixed to the floor board 10 adjacent to the edges of the slot 7. The ratchet is made thicker at its upper end than at its lower end so that the plane of the teeth is inclined or curved to compensate for the tangential inclination of the floor relatively to the arc described by the point of the pawl.

The ratchet tooth 29' is so positioned that when the pawl 15 is engaged therewith the clutch-pedal 4 is held in "neutral" position, and the ratchet teeth 29'' are so positioned that when the pawl 15 is engaged with one of them the clutch pedal is held in "low" speed position, a plurality of teeth 29'' being provided so as to accommodate varying degrees of tightness or wear of the "low" transmission band.

It will be understood that when the car is running under normal conditions, the clutch is engaged and the transmission held in "high" automatically, the pedal 4 being then at the rear of the slot 7 and the pawl entirely disengaged from the ratchet. To disconnect the engine from the transmission shaft, pressure is applied to the shoe 20 and member 23 to rock the pedal 4 to the intermediate position. Upon releasing the pressure upon the member 23, the spring 17 elevates the pawl 15 into engagement with the tooth 29' of the ratchet, and the clutch is held in "neutral" position. By applying the pressure of the foot to the member 23, the pawl is released from the ratchet to permit the pedal 4 to be moved back into "high" or forward into "low," in which latter position the pedal may be secured by releasing the pressure on the member 23 and permitting engagement of the pawl with a ratchet tooth 29'', thereby maintaining "low" speed.

Having described my invention, I claim:—

1. The combination with a clutch pedal, of a foot-rest connected therewith and having a rocking member at the heel thereof, a link pivotally connected with said rocking member, and pawl and ratchet mechanism having a member connected with said pedal, said link being connected with said member and operable to trip said mechanism.

2. The combination with a clutch-pedal, of a control attachment therefor comprising pawl and ratchet members, one of said members being pivotally connected with said pedal, a reciprocatory link connected with said member, and a rocking device hinged at the heel of said pedal and connected with said link for rocking said member to release said pedal.

3. The combination with a clutch pedal, of a control attachment therefor comprising an undercut yoke sleeved on said pedal, a wedge disposed in the way formed by said undercuts to secure said yoke to said pedal, pawl and ratchet members one of which is pivotally connected with said yoke, and a tripping device for disengaging said pawl and ratchet members from each other.

4. The combination with a clutch-pedal having a foot-rest, of a control attachment therefor comprising a shoe secured over said foot-rest, and having a rocking member, latching mechanism, and a link connecting said member and mechanism so that the rocking of the former operates the latter.

5. The combination with a pivoted clutch-pedal having a foot rest, of a control attachment therefor comprising a rocking member at the heel of the foot rest and connected with the pedal so as to be operable by the foot, a bracket fixed to said pedal below said rocking member, a pawl pivotally connected with said bracket, a ratchet beveled to accommodate the movement of said pawl about the axis of said pedal, a spring normally pressing said pawl and ratchet into engagement, and a link connecting said rocking member with one of said pawl and ratchet members.

6. A clutch pedal control attachment for automobiles comprising a bracket for engaging a pedal shaft, a pawl pivotally connected with said bracket, a spring interposed between said pawl and bracket and pressing said pawl away from said bracket, a link having a member for operating said pawl and passing through said spring and bracket, a treadle for operating said link, and a ratchet coacting with said pawl and disposed between it and said treadle.

In testimony whereof I have hereunto set my name this 28th day of August, 1922.

R. D. SAYLOR.